United States Patent
Chen et al.

(10) Patent No.: US 9,259,811 B2
(45) Date of Patent: Feb. 16, 2016

(54) SEGREGATING APPARATUS FOR OBJECTS AND MATERIALS

(71) Applicants: SHENZHEN FUTAIHONG PRECISION INDUSTRY CO., LTD., Shenzhen (CN); FIH (Hong Kong) Limited, Kowloon (HK)

(72) Inventors: Ze Chen, Shenzhen (CN); Bing Yu, Shenzhen (CN); Jian-Ping Jin, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/303,991

(22) Filed: Jun. 13, 2014

(65) Prior Publication Data
US 2014/0369770 A1   Dec. 18, 2014

(30) Foreign Application Priority Data
Jun. 17, 2013   (CN) ............................ 2013 1 0236955

(51) Int. Cl.
*B65G 51/30*   (2006.01)
*B23P 19/00*   (2006.01)

(52) U.S. Cl.
CPC .................................. *B23P 19/003* (2013.01)

(58) Field of Classification Search
USPC ............................. 406/88, 155, 176; 414/676
See application file for complete search history.

(56) References Cited

U.S. PATENT DOCUMENTS

| | | | | |
|---|---|---|---|---|
| 6,736,588 | B1* | 5/2004 | Baldwin et al. | 414/676 |
| 7,223,060 | B2* | 5/2007 | Weidenmuller | 414/676 |
| 8,092,143 | B2* | 1/2012 | Yang et al. | 414/676 |
| 8,292,549 | B2* | 10/2012 | Iida | 406/88 |
| 8,376,663 | B2* | 2/2013 | Erceg et al. | 406/88 |
| 8,740,506 | B2* | 6/2014 | Ogaki et al. | 406/83 |
| 9,051,133 | B2* | 6/2015 | Kremser | |

* cited by examiner

*Primary Examiner* — Joseph Dillon, Jr.
(74) *Attorney, Agent, or Firm* — Novak Druce Connolly Bove + Quigg LLP

(57) ABSTRACT

An apparatus for segregating and positioning work-pieces and other objects at different desired positions includes a main body, a segregating system, and a plurality of dispensing channels defined in the main body. The segregating system has a receiving chamber and a plurality of gas inlets both defined in the main body. The receiving chamber is configured to house the work-pieces. The gas inlets are configured to allow a high-pressure gas fed therethrough into the receiving chamber. Each dispensing channel has a connecting end communicating with the receiving chamber and a positioning end opposite to the connecting end. The work-pieces are able to be driven by the high-pressure gas to move to the positioning ends through the connecting end.

7 Claims, 4 Drawing Sheets

SEGREGATING APPARATUS FOR OBJECTS AND MATERIALS

FIELD

The disclosure generally relates to material segregating apparatuses, and particularly to a material segregating apparatus for segregating and positioning a plurality of work-pieces at different desired positions.

BACKGROUND

During assembly of an electronic device, multiple identical components (such as screws) are often required to be fitted in the electronic device. To reduce assembling processes, the multiple identical components can be manually fixed to different positions of a fixing tool before assembled to the electronic device. The fixing tool is then engaged with the electronic device, enabling each of the multiple identical components to be aligned with a correct position of the electronic device. As such, all of the multiple identical components then can be fitted to the electronic device at the same time.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
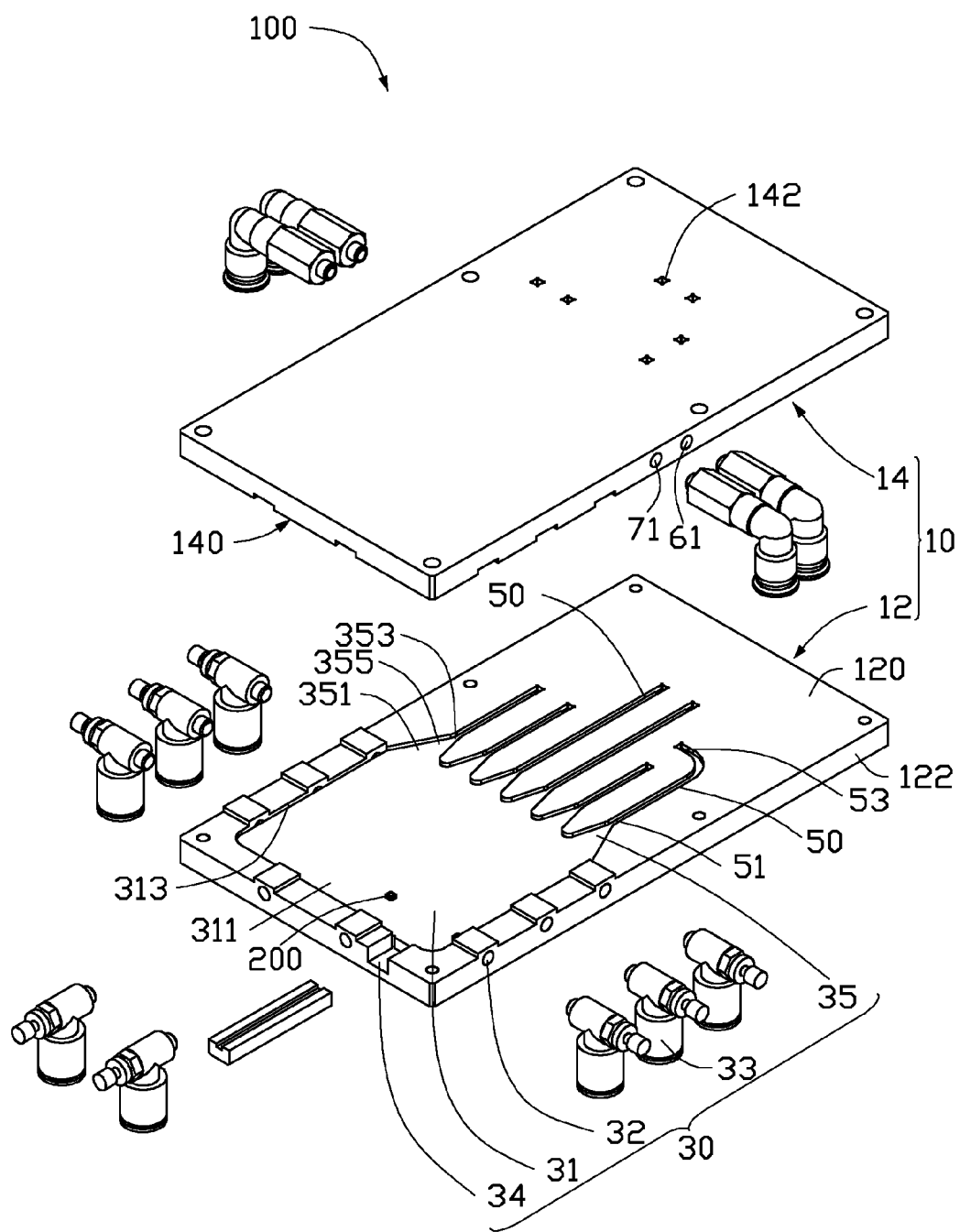
FIG. 1 is an exploded, schematic view of a segregating apparatus, according to an exemplary embodiment of the disclosure.

FIG. 1 shows a segregating apparatus 100 for segregating and positioning a plurality of work-pieces 200 (only one is shown in the drawings) at different desired positions individually, according to an exemplary embodiment of the disclosure. In this exemplary embodiment, the work-pieces 200 are square nuts. The segregating apparatus 100 includes a main body 10, a segregating system 30, a plurality of dispensing channels 50, a block-eliminating system 60, and a driving system 70.

In this exemplary embodiment, the main body 10 includes a first board 12 and a second board 14 engaged with the first board 12. Both the first board 12 and the second board 14 are substantially rectangular. The first board 12 has a first surface 120. The second board 14 has a second surface 140 facing the first surface 120. The second board 14 defines a plurality of through holes 142 for the work-pieces 200 to be taken out therefrom by a robot (not shown) for example. Each of the through holes 142 has a size and shape substantially equal to that of the work-pieces 200. The first board 12 and the second board 14 are secured to each other with the first surface 120 facing and engaged with the second surface 140.

The segregating system 30 includes a receiving chamber 31, a plurality of gas inlets 32, a plurality of gas connectors 33, a work-piece inlet 34, and a plurality of work-piece outlets 35. The receiving chamber 31, the plurality of gas inlets 32, the work-piece inlet 34, and the plurality of work-piece outlets 35 are defined in the main body 10. The plurality of gas inlets 32 are connected to a conventional high-pressure gas source 300 (see FIG. 3)

In this exemplary embodiment, the receiving chamber 31 is defined in the first surface 120 and is a substantially rectangular recess. The receiving chamber 31 has a first bottom wall 311 and a sidewall 313 connected to and surrounding the first bottom wall 311. The plurality of gas inlets 32 are defined through the sidewall 313 and an exterior peripheral wall 122 of the first board 12, thereby communicating with and surrounding the receiving chamber 311. As previously mentioned, the plurality of gas inlets 32 can be connected to the high-pressure gas source 300 through the plurality of gas connectors 33. The work-piece inlet 34 is defined through the sidewall 313 and an exterior peripheral wall 122 of the first board 12, thereby communicating with the receiving chamber 311. The work-piece inlet 34 is configured for feeding the work-pieces 200 into the receiving chamber 31.

The plurality of work-piece outlets 35 are defined in the first surface 120 and communicate with the receiving chamber 31. In this exemplary embodiment, the plurality of work-piece outlets 35 communicates with the same end of the receiving chamber 31. Each work-piece outlet 35 is a substantially tapered recess and includes a broad end 351 and a narrow end 353 opposite to the broad end 351. The broad end 351 has a larger diameter than that of the narrow end 353 and communicates with the receiving chamber 31. In this exemplary embodiment, each work-piece outlet 35 has a second bottom wall 355 coplanar with the first bottom wall 311.

Each dispensing channel 50 is a substantially strip-shaped recess defined in the first surface 120 and communicating with one of the work-piece outlets 35. Each dispensing channel 50 has a connecting end 51 and a positioning end 53 opposite to the connecting end 51. The connecting end 51 of each dispensing channel 50 communicates with the narrow end 353 of a work-piece outlet 35. Each positioning end 53 is located at a desired position where the work-piece 200 is required to be positioned. Each positioning end 53 is aligned with one of the through holes 142 and a work-piece 200 retained at the positioning end 53 can be taken out by the robot.

Figure 2:
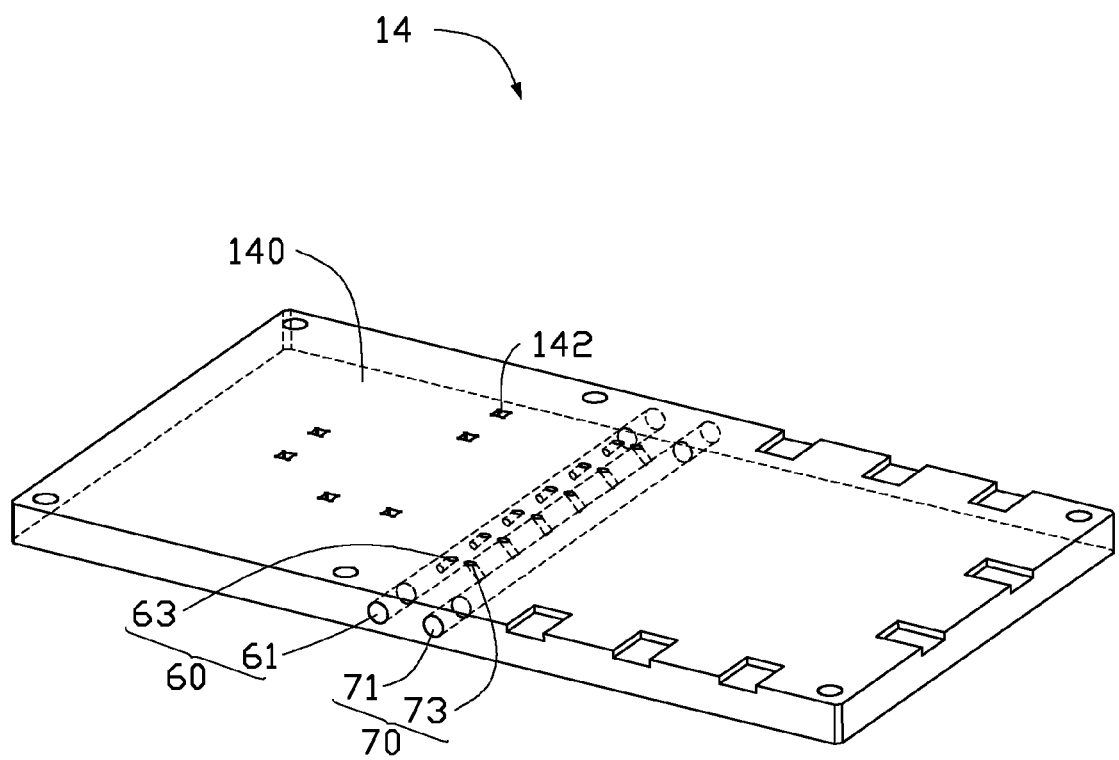
FIG. 2 is a schematic view of part of the segregating apparatus of FIG. 1, but from another perspective.
Figure 3:
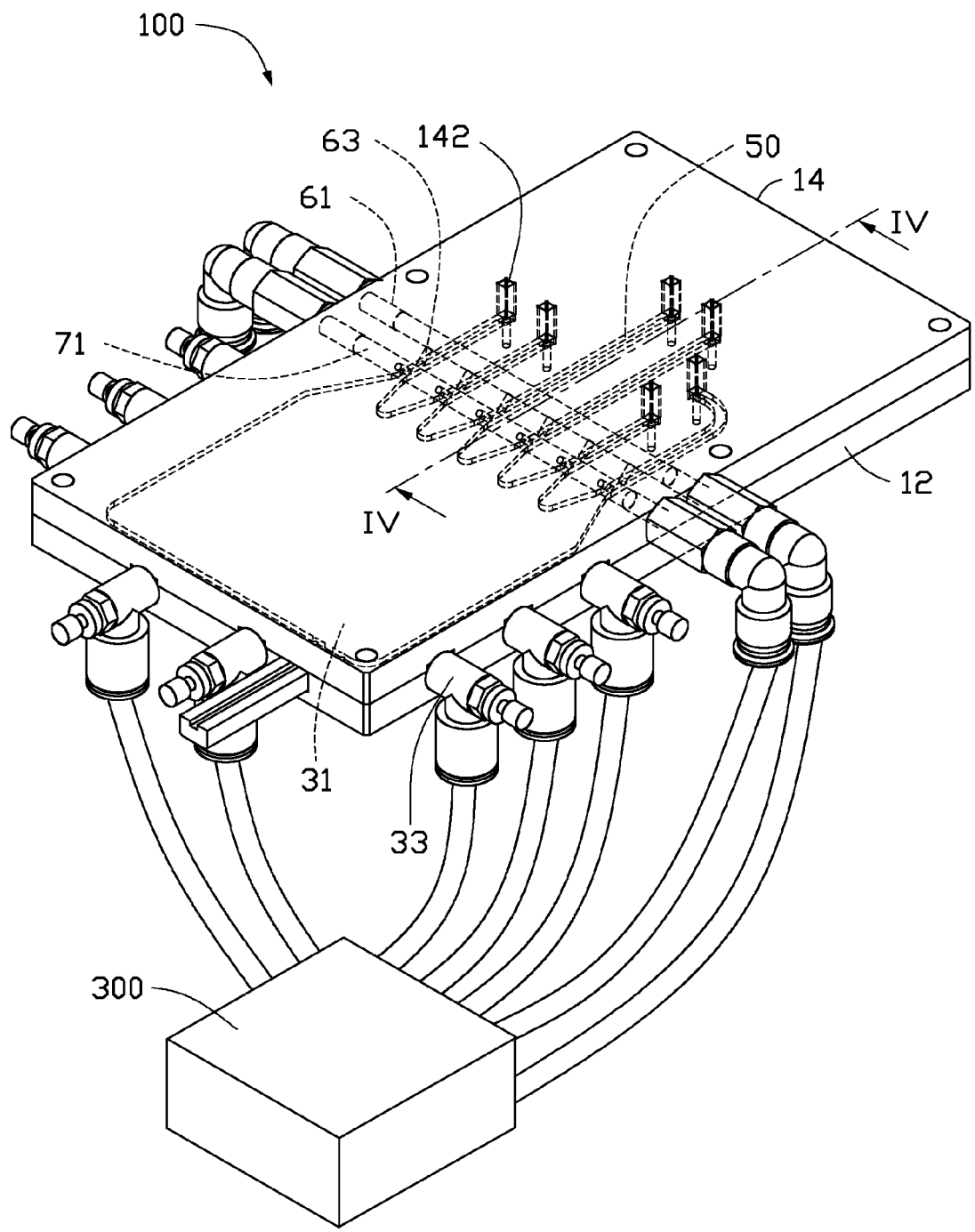
FIG. 3 is an isometric view of the material segregating apparatus of FIG. 1.
Figure 4:
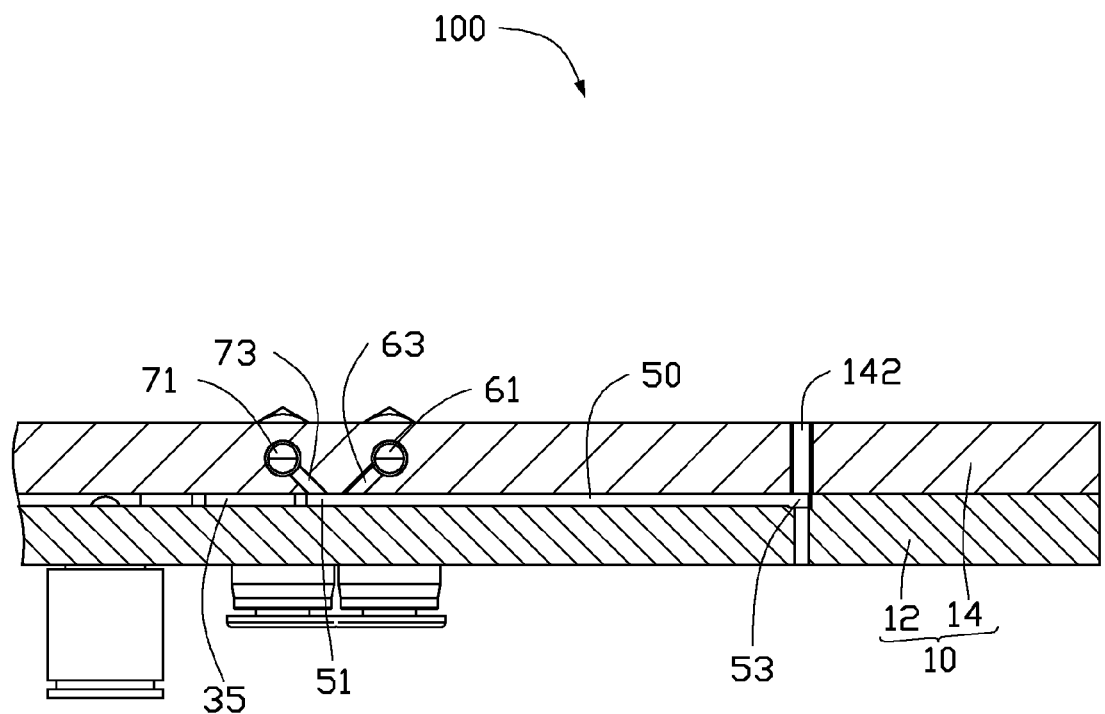
FIG. 4 is a cross-sectional view of the segregating apparatus of FIG. 3 taken along line IV-IV.

Referring to FIG. 2, the block-eliminating system 60 includes a first main gas channel 61 and a plurality of first divisional gas channels 63 communicating with the first main gas channel 61. In this exemplary embodiment, the first main gas channel 61 and the plurality of first divisional gas channels 63 are defined in the second board 14. In other embodiments, the first main gas channel 61 and the plurality of first divisional gas channels 63 can also be pipes disposed inside the second board 14. The first main gas channel 61 is defined through two sides of the second board 14 and can communicate with the high-pressure gas source 300. Referring to FIGS. 3 and 4, each first divisional gas channel 63 has an end communicating with the first main gas channel 61 and an opposite end defined through the second surface 140 to communicate with the connecting end 51 of one of the dispensing channel 50. Each first divisional gas channel 63 is oriented at an acute angle to a dispensing channel 50, enabling a gas flow vented from the first divisional gas channel 63 to create a displacement directed to the receiving chamber 31 in a dispensing channel 50, which forces work-pieces 200 which may jam at the work-piece outlets 35 and the connecting ends 51 back into the receiving chamber 31, thereby eliminating blockages.

The driving system 70 includes a second main gas channel 71 and a plurality of second divisional gas channels 73 communicating with the second main gas channel 71. In this exemplary embodiment, the second main gas channel 71 and the plurality of second divisional gas channels 73 are defined in the second board 14. In other embodiments, the second main gas channel 71 and the plurality of second divisional gas channels 73 can also be pipes disposed inside the second board 14. The second main gas channel 71 is defined through the two sides of the second board 14 and can communicate with the high-pressure gas source 300. Each second divisional gas channel 73 has an end communicating with the second main gas channel 71 and an opposite end defined through the second surface 140 to communicate with the connecting end 51 of one of the dispensing channel 50. Each second divisional gas channel 73 is oriented at an acute angle to a dispensing channel 50, enabling gas flow vented from the second divisional gas channel 73 to create a displacement directed to the positioning end 53 in a dispensing channel 50, which forces work-pieces 200 in the dispensing channel 50 to move to the positioning end 53.

When the second board 14 is secured to and engaged with the first board 12, the second surface 140 of the second board 14 covers the receiving chamber 31, the work-piece outlets 35, and the dispensing channel 50, ensuring a certain pressure of gas in the receiving chamber 31, the work-piece outlets 35, and the dispensing channel 50.

In operation, the work-pieces 200 to be segregated can be fed into the receiving chamber 31 through the work-piece inlet 34. Once there are enough work-pieces 200, about 100 to about 150 pieces for example, in the receiving chamber 31, high-pressure gas (such as air) is fed from the high-pressure gas source 300 into the receiving chamber 31 through the gas inlets 32. The work-pieces 200 are moved by the high-pressure gas and enter the work-piece outlets 35 at random. If work-pieces 200 jam at the work-piece outlets 35 or at the connecting ends 51, high-pressure gases are fed into the dispensing channels 50 from the first divisional gas channels 63 of the block-eliminating system 60 to force the work-pieces 200 to move back into the receiving chamber 31. Then, high-pressure gases are fed into the dispensing channels 50 from the second divisional gas channels 73 of the driving system 70 to drive the work-pieces 200 in the dispensing channels 50 to move to the positioning ends 53. The driving system 70 and the block-eliminating system 60 can work in turn. Work-pieces 200 reaching the positioning ends 53 can be taken out by the robot through the through holes 142.

In manufacture, the main body 10 includes the first board 12 and the second board 14. However, in other embodiments, the first board 12 and the second board 14 can be integral.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A segregating apparatus, for segregating and positioning work-pieces at different desired positions, comprising:
    a main body;
    a segregating system comprising a receiving chamber defined in the main body and a plurality of gas inlets defined in the main body, the receiving chamber configured to house the work-pieces, the gas inlets configured to allow a high-pressure gas fed therethrough into the receiving chamber; and
    a plurality of dispensing channels defined in the main body, each dispensing channel comprising a connecting end communicating with the receiving chamber and a positioning end opposite to the connecting end, the work-pieces able to be driven by the high-pressure gas to move to the positioning ends from the receiving chamber;
    wherein the segregating system further comprises a plurality of work-piece outlets defined in the main body; each work-piece outlet is a substantially tapered and comprises a broad end and a narrow end opposite of the broad end; the broad end has a larger diameter than the diameter of the narrow end and communicates with the receiving chamber; the connecting ends of the dispensing channels communicate with the narrow ends, and
    wherein the segregating apparatus further comprises a block-eliminating system able to feed high-pressure gas into all the dispensing channels to force the work-pieces which piled in the work-piece outlets and the connecting ends to move back into the receiving chamber; and
    wherein the block-eliminating system comprises a first main gas channel and a plurality of first divisional gas channels; the first main gas channel and the first divisional gas channels are defined in the main body; each first divisional gas channel comprises an end communicating with the first main gas channel and an opposite end communicating with the connecting end of one of the dispensing channels.

2. The segregating apparatus as claimed in claim 1, wherein each of the first divisional gas channels is oriented at an acute angle to the corresponding dispensing channel, enabling a gas flow vented from the first divisional gas channel to create a displacement directed to the receiving chamber in the corresponding dispensing channel.

3. The segregating apparatus as claimed in claim 1, further comprising a driving system able to feed high-pressure gas into all the dispensing channels to force the work-pieces in the dispensing channels to move to the positioning ends.

4. The segregating apparatus as claimed in claim 3, wherein the driving system comprises a second main gas channel and a plurality of second divisional gas channels; the second main gas channel and the second divisional gas channels are defined in the main body; each second divisional gas channel comprises an end communicating with the second main gas channel and an opposite end communicating with the connecting end of one of the dispensing channels.

5. The segregating apparatus as claimed in claim 4, wherein each of the second divisional gas channels is oriented at an acute angle to the corresponding dispensing channel, enabling a gas flow vented from the second divisional gas channel to create a displacement directed to the positioning end in the corresponding dispensing channel.

6. The segregating apparatus as claimed in claim 1, wherein the main body defines a plurality of through holes each communicating with one of the positioning ends.

7. The segregating apparatus as claimed in claim 1, wherein the segregating system further comprises a work-piece inlet for feeding the work-pieces into the receiving chamber.

* * * * *